United States Patent [19]

Thalmann et al.

[11] Patent Number: 4,642,154
[45] Date of Patent: Feb. 10, 1987

[54] METHOD AND APPARATUS FOR WELDING CONDUITS

[75] Inventors: Alfred Thalmann, Uhwiesen; Ernesto Lehmann, Schaffhausen; Emil Roth, Gümligen; Walter Gerber, Rüfenacht, all of Switzerland

[73] Assignee: Georg Fischer Aktiengesellschaft, Schaffhausen, Switzerland

[21] Appl. No.: 450,038

[22] Filed: Dec. 15, 1982

[30] Foreign Application Priority Data

Dec. 23, 1981 [CH] Switzerland ............... 8239/81

[51] Int. Cl.$^4$ ............................................. B32B 1/08
[52] U.S. Cl. ..................... 156/272.2; 156/64; 156/274.2; 156/352; 156/366; 156/368; 156/378; 219/490; 219/492; 219/497
[58] Field of Search ............. 156/64, 272.2, 275.1, 156/293, 352, 359, 366, 368, 378, 294, 274.2; 219/490, 492, 497

[56] References Cited

U.S. PATENT DOCUMENTS

| 3,564,204 | 2/1971 | Mense .............................. 219/497 |
| 3,578,518 | 5/1971 | Gregg et al. ...................... 156/64 |
| 3,600,247 | 8/1971 | Armstrong, Jr. ................... 156/64 |
| 4,056,208 | 11/1977 | Soodak et al. ................... 219/499 |
| 4,275,345 | 6/1981 | Tait ................................. 323/363 |
| 4,349,397 | 9/1982 | Sturm ............................ 156/379.7 |

FOREIGN PATENT DOCUMENTS

| 2077990 | 10/1971 | France . |
| 2424118 | 4/1979 | France . |
| 437755 | 11/1967 | Switzerland . |
| 523130 | 7/1972 | Switzerland . |

Primary Examiner—David Simmons
Assistant Examiner—Merrell C. Cashion, Jr.
Attorney, Agent, or Firm—Roylance, Abrams, Berdo & Goodman

[57] ABSTRACT

A heating wire embedded in any one of several types of shaped elements is fed current by an electrical control apparatus for a time interval which is a function of the ohmic resistance of the wire and the type of shaped element. The type and resistance are automatically determined in advance by measurement of the wire impedance which indicates type and of the ohmic resistance. Welding time is selected from a predetermined directrix depending on resistance, and the directrix itself is chosen on the basis of type by the impedance measurement. A count representative of the time is stored in a counter and pulsed down to zero while current is delivered.

18 Claims, 5 Drawing Figures

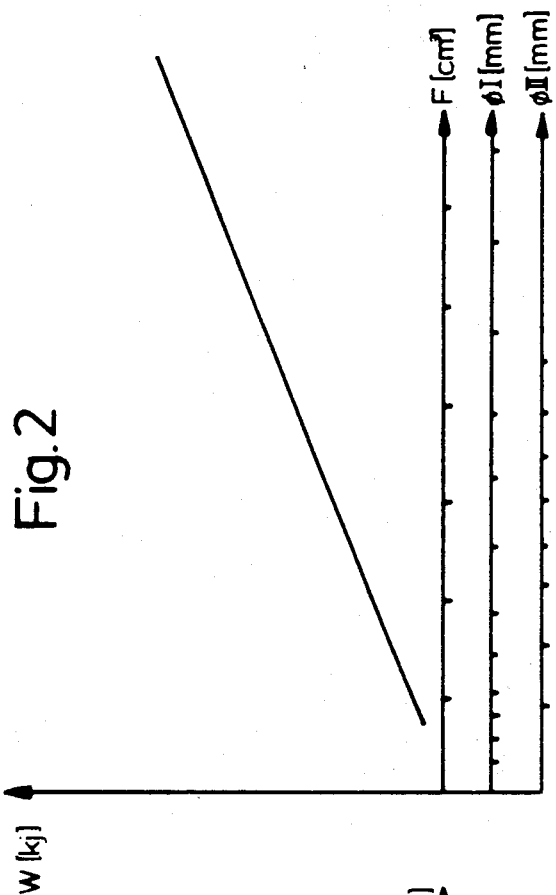
Fig. 1
Fig. 2
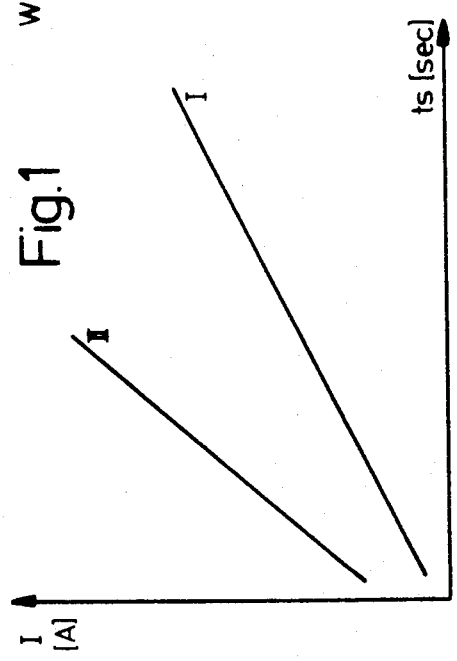
Fig. 3
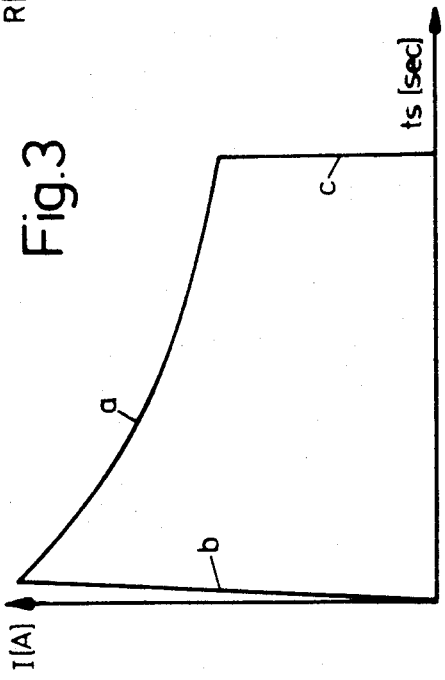
Fig. 4

METHOD AND APPARATUS FOR WELDING CONDUITS

This invention relates to a method of joining by welding elongated plastic conduits using an enclosing, shaped body with an embedded coil of heating wire to which a metered quantity of electrical energy is supplied.

BACKGROUND OF THE INVENTION

Various processes are known for forming weld connections between plastic components, i.e., polymeric components which are thermoplastic in nature. In one such technique, a welding muff with concealed or embedded wires forming a heating coil is fitted over the abutting ends of two plastic pipes to be joined so that the ends at the connection point can be melted and recooled, forming a tight connection.

Because pipes and welding muffs of different diameters and correspondingly different welding energy requirements are to be handled, the current supply devices must be adjustable so as to be adaptable to these different operation parameters. Heretofore, apparatus of this sort is adjusted in accordance with the nominal width or diameter of the welding muff and then supplied with a heating current at constant operating voltage for a predetermined time interval, the total heating energy supplied thus being the product of current, voltage and time.

With such known devices, however, there is a significant danger that the operator can make an error and can set into the apparatus an incorrect nominal width or diameter so that either too much or too little heat energy is supplied, either of which can lead to an improper weld.

A monitoring device for plastic welding devices is shown in Swiss patent document No. 523,130 wherein a desired value corresponding to the heat energy required for the relevant sizes of the connections or of the coil is set by a setting means. It is monitored only as to whether the given weld energy corresponding to the set "theoretical" value was or was not correctly measured. Thus, erroneous operation still cannot be precluded.

With the process disclosed in Swiss patent document No. 518,790 or French patent document No. 2,077,990, only the welding time or the welding capacity dependent upon the surrounding temperature is modified such that the final temperature of the weld point independent of the surrounding temperature is substantially always the same. A theoretical or desired value, however, must also be set into the device so the quality of the weld, even in this apparatus, depends on the correct setting.

BRIEF DESCRIPTION OF THE INVENTION

An object of the invention is to provide a method for controlling the weld apparatus such that it is possible to form a good weld by preventing a lack of coordination between the heating energies supplied to the elements and the heat required for a good weld of those elements.

A further object is to provide an apparatus for performing this method and to provide a technique which permits simple operation of the apparatus.

Briefly described, the invention includes a method of welding together plastic conduit elements using shaped elements containing windings of electrically conductive heating wire and supplying electrical energy to the wire by a control apparatus connected to a source of electrical energy such that an appropriate heating current is passed through the wire to heat and weld the components including the steps of manually producing a start signal, passing a direct current through the windings of the heating wire in response to the start signal and measuring the ohmic resistance of the windings, allotting a time interval for the welding process by selecting a number of counts as a function of the measured ohmic resistance corresponding to a selected one of a plurality of predetermined relationships, storing the number of counts in a counting device, initiating the flow of heating current supplying impulses to the counting device to reduce the count to zero, and terminating the flow of heating current when the count reaches zero.

In another aspect, the invention includes an apparatus for the control and apportionment of electrical energy to a heating winding for welding tubular elements together wherein the winding is housed in a shaped element which can be placed around the adjacent ends of the tubular elements so that electrical energy can be supplied to the winding to heat and weld the elements together, and wherein the shaped element and winding is one of a plurality of different types thereof having differing characteristics, comprising the combination of a source of electrical energy; means for measuring the ohmic resistance of the winding; counter means for storing a selected welding time as a preset count; means for selecting a welding time as a function of the measured resistance in accordance with a predetermined relationship and for storing the time in said counter; means for initiating flow of welding current from said source to said winding; pulse generator means for delivering pulses to said counter means while said welding current is flowing to cause the count in said counter means to count down to zero; and means for terminating the flow of current when said counter means reaches zero.

As will be seen from the following description, by measurement of the ohmic resistance of the heating wire and the coordination of welding time in accordance with a predetermined directrix program as a function of the measured ohmic resistance, the setting of a welding time corresponding to the nominal width or diameter or to other data relating to the articles to be welded is no longer required so that faulty welds are essentially eliminated.

Measurement of the impedance can determine whether a closed heating coil, of the type used with welding muffs, is involved or whether the apparatus involves a heating mat which can be fitted around the pipe as is used with clamping rings.

Different welding times are required for the two types, even with the same pipe diameters, and this is automatically taken into account by the selection of the corresponding program directrix as a result of the impedance measurement. Other advantages also result from the automatic compensation of voltage deviations and surrounding temperature by adjustment of the weld time.

The apparatus is further characterized by simplicity of operation in that, in addition to a start switch and a circuit breaker, the apparatus has no further setting or operational controls.

The control logic, which is used in interaction with the measurement devices for determining the ohmic resistance and impedance, facilitates an automatic operating sequence of the welding process and guarantees fault-free welds.

In order that the manner in which the foregoing and other objects are attained in accordance with the invention can be understood in detail, particularly advantageous embodiments will be described with reference to the accompanying drawings which form a part of this specification and wherein:

FIG. 1 is a graph illustrating the operational relationship between weld time and heating current;

FIG. 2 is a graph illustrating the heating energy required as a function of the physical dimensions of the surfaces to be joined;

FIG. 3 is a graph of the heating current as a function of time illustrating the programmed sequence;

FIG. 4 is a graph of the interrelationship between ohmic resistance of the heating coils and time.

Figure 5:
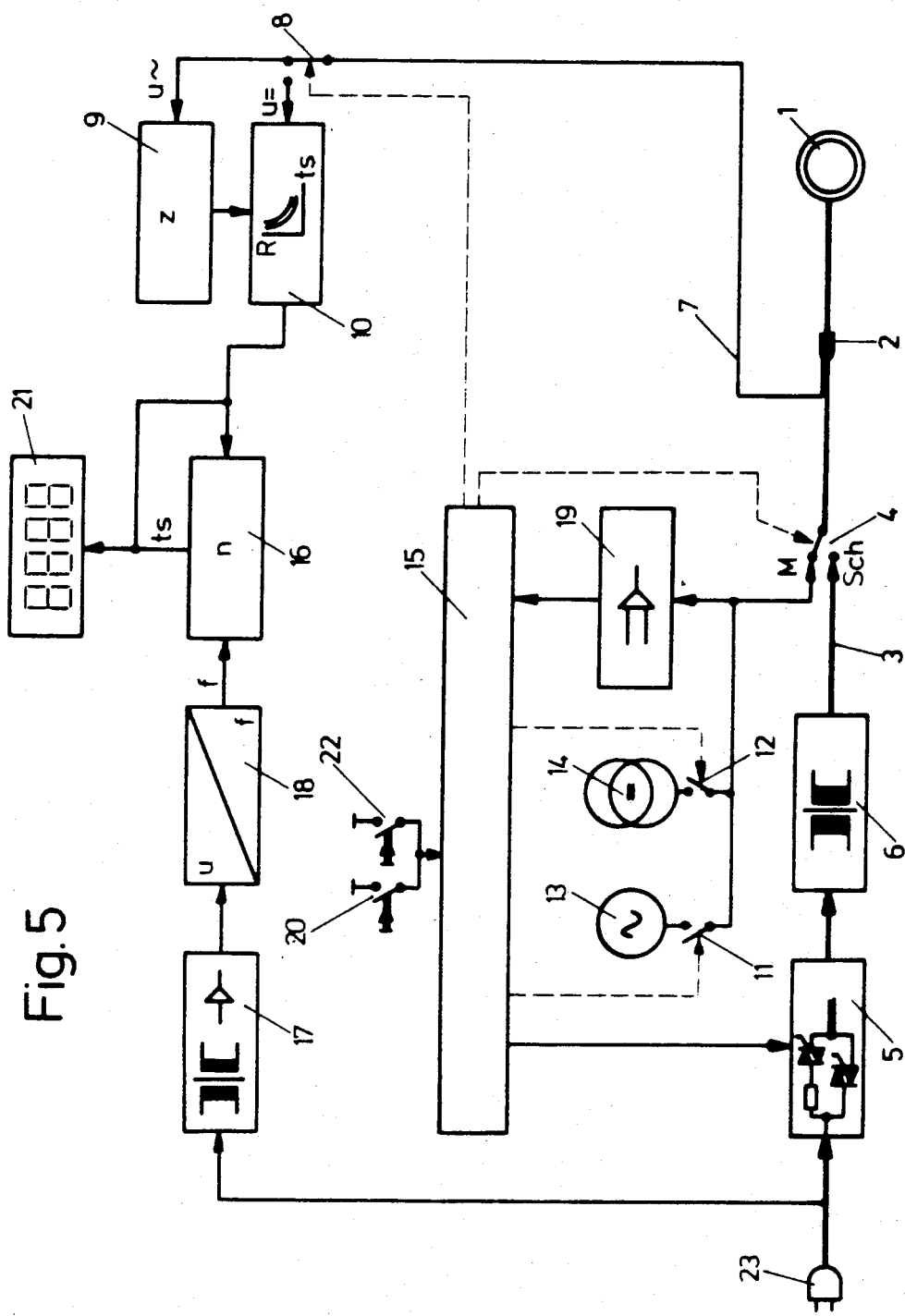
FIG. 5 is a schematic circuit diagram, in block form, of an apparatus in accordance with the invention for performing the method thereof.

Referring now to the figures in greater detail, it will be seen that FIG. 1 shows the relationship between welding time, i.e., the time during which heating current flows, and the current density, recognizing that this interrelationship can be set as desired. The selectability of this relationship is shown in that, for a series of dimensions or standard sizes of shaped parts and of welding or heating muffs, the electrical resistance of the heating coil is selected so that the heating current, the magnitude of which is chosen on the basis of a voltage which is uniform and fixed for all sizes, when multiplied by the voltage gives a heating capacity which determines the heating time by dividing the heating energy necessary for a certain shaped element or muff size by the heating capacity. The product is therefore determined by three parameters. Two of these parameters can be selected and the third is determined by those choices. With the voltage held constant, one of the three parameters, current, voltage and heating time, is fixed so that only one of the two others can be optionally selected. It would theoretically be possible to also leave a second parameter constant. For example, with constant current or heating time, the work area is then enlarged by the variation of all of its parameters, if the variations are limited. Another advantage obtained is automatic compensation for the initial temperature of the weld point when the resistance wire of the coil is, for example, of copper or copper alloys.

Two curves are shown in FIG. 1 illustrating the optional selectability of the gradient, or the slope of the curve, depending upon circumstantial parameters.

Curve I with the lower gradient, applies particularly to welding muffs which are initially in a frozen-in expanded state. Muffs of this sort are known and are described in European patent document No. A1 0 036 963. With a muff of this type, it is advisable to work for a longer time, with a relatively low current so that the muff which is fitted in its expanded state onto the pipe connection point is heated slowly and can shrink before the actual welding process takes place. This shrinkage produces as good as possible a "wedge locking" between the pipe ends and the muff, thus guaranteeing the weld pressure necessary for a good weld.

Curve II applies to centering clamping rings which are fitted around a pipe which is already completely laid out and, under some conditions, is also under pressure, the device being of the type wherein the clamping ring itself does not produce a friction closure but is pressed onto the pipe by a clamp device. Clamping rings of this type are described in Swiss Pat. No. 570,577. Slow warm up is not required in this case, but, on the contrary, with the pipes already under pressure, as short as possible a welding time and, thus, high current, are desired so that the temperature gradient in the pipe from the outside to the inside, with a given outside temperature in the weld area, is as low as possible so that the stability of the pipe is still guaranteed during the welding.

Curves I and II combine the points representing pairs of values for current and time for a series of muff or clamping ring sizes.

FIG. 2 is a diagram showing the heating energy which is necessary for the welding of muffs and clamping rings as a function of the dimensions of the surfaces of the parts to be welded. Muffs and clamping rings have welds of different lengths for the different nominal widths or diameters which gives different areas of surfaces (F) to be welded so that the heating energy per surface unit to be welded is the same for both but is different for the entire muff or clamping ring of the same nominal width of diameter. Thus, in FIG. 2, the abscissa I is for the muffs and II is for clamping rings which could be illustrated by two curves which, however, are not parallel. The basis for this lies in the fact that the weld surfaces of the clamping rings and muffs increase differently with changes in the nominal width or diameter because the widths of clamping rings and hoods vary with the different diameters. The weld surface of the clamping rings thus increases linearly with increases in the diameter if the thickness is constant. With the muff, however, the thickness also changes with the nominal diameter so that a higher exponential dependence of the weld surface and, therewith, the total welding energy required, is present with muffs than with clamping rings.

An immaterial difference of the energy densities of muffs and clamping rings is the result of the different welding velocities since the heat losses are somewhat greater with the longer process.

FIG. 3 shows a diagram of welding current as a function of time. With the beginning of the current at the origin (t=0) point of time, the current density rises abruptly to its maximum (line b) and then drops again as the electrical conductor is heated, corresponding to the material-dependent positive temperature coefficient (curve a).

In a series of experiments, the initial and final resistance values of the heating coils were determined for curve a wherein typical values were attained for copper coils which indicated that the final resistance was approximately 1.7 times the initial resistance, i.e., $$R_f \approx 1.7(R_i)$$

On the basis of the foregoing explanation of FIGS. 1 and 2, the elements which are of different dimensions as well as different configurations, e.g., as muff or clamping ring, can be identified by electrical measurement and the welding time required for each element can then be set automatically in the control apparatus.

To determine whether the heating element is a muff or a clamping ring, the impedance (also called the apparent resistance) of the coil which is previously connected to the apparatus is first measured with an alternating current wherein the ohmic resistance and the inductive reactance of the coil interact.

Muffs have heating coils with closed loops because a muff consists of a complete, closed cylinder and the coil is thus called an air coil. A clamping ring corresponds somewhat to an arm band which must be opened in order to permit fitting the band around the weld region and is entirely or partially closed only in its fitted-on condition. In this case, of course, the heating wire must also be arranged in such a manner that it is laid as a mat around a pipe and then connected or is simply clamped in this position the same as the clamping ring.

A very suitable arrangement of the heating wire for this purpose is simply a rectangle with an undulating or sinuous wire path wherein one side of the rectangle corresponds to the pipe periphery, or a part of the pipe periphery, and the other dimension corresponds to the axial dimension of the mat on the pipe.

Since, with comparable wire diameters and wire lengths, the inductance of an air coil is considerably greater than that of the undulating arrangement of the wire in a mat, as a result of the measurement of the impedance of either the coil or the mat, as the case may be, it can be determined in a simple manner whether a muff or a clamping ring is involved.

Then, a differently preselected directrix I or II, as shown in FIG. 4, is used for the muff or the clamping ring, each directrix giving a welding time which is dependent upon the ohmic resistance of the coil.

The appropriate one of directrices I or II is selected on the basis of the different impendances between the air coil and mat arrangements, with the muff or the clamping ring which is determined by the measurement. Then, the ohmic resistance is measured with a constant direct current and the corresponding welding time is determined from the selected directrix I or II.

The welding time is measured by individually counting steps of which the number is preselected by the ohmic resistance measurement. The frequency of the counting steps or pulses is dependent upon the primary voltage supplied. Thus, the voltage deviations depending on the relevant capacity during welding time are compensated so that the supply of the required welding energy is maintained within allowable limits.

The compensation for the surrounding temperature by the welding time is obtained by selection of the conductive material of the coil. With copper or copper alloys and also, for example, with aluminum and aluminum alloys, the dependence of the specific resistance on the temperature is such that the influence of the surrounding temperature is automatically compensated by the resistance measurement before beginning the welding, and by the subsequent determination of the welding time on the basis of the directrix with the energy feed.

FIG. 5 shows a simplified blocked diagram of an apparatus for controlling the supply of the electrical energy.

A coil 1 of a shaped element, which can be either a muff or a clamping ring, is connected through an electrical connector 2 with the movable element of a selector switch 4 connected to the power circuit 3. An electronic switch 5 having soft-start and a welding transformer 6 are connected in the power circuit 3, the switch 5 having its input connected to a source of electrical energy indicated by plug 23 which can be connected to the electric supply line or to another energy source such as a generator. A measuring line 7 leads from plug 2 to the fixed contact of a selector switch 8 which forms a connection to an impedance measuring device 9 for the identification of the welding element and to a measuring device 10 for the ohmic resistance measurement, device 10 having stored therein directrices I/II shown in FIG. 4 in each of which the time $$t_s = f(R).$$

Measuring line 7 is connected through switch 4 and through a circuit 11 with a sinusoidal oscillator 13 which can produce an alternating current measurement signal or to a circuit 12 which includes a constant current source 14 for the production of a direct current measurement signal.

Circuits 4, 8, 11, and 12 can be controlled by a control logic unit 15 in a simple manner.

Measuring device 10 is connected to work in conjunction with a pulse generator and preset counter or register 16 for determination of the welding time of which the counting frequency (rate) is a function of the primary voltage and can be influenced by a primary voltage measuring apparatus 17 and a voltage-to-frequency converter 18.

A digital display 21 for optical display of the type of shaped element, of the measured ohmic resistance, and of the welding time of the process is connected to operate in conjunction with counter or register 16 or with measuring devices 9 and 10 as appropriate.

Control device 19, which is connected to work with control logic 15, serves to determine whether coil 1 and plug 2 are connected or have been disconnected. Furthermore, a start circuit 20 and a stop circuit 22 are connected to work in conjunction with control logic 15 and this is connected to work with electronic switch device 5 in power circuit 3.

The welding process operation proceeds as follows using the apparatus described in connection with FIG. 5.

After connection by plug 2 of coil 1 of a shaped element such as, for example, a muff or clamping ring with the apparatus by means of a manual starting signal, the measuring phase is conducted by control device 19 and control logic 15 in which switch 4 remains in the position shown with the movable element at contact M. The impedance is then measured by measuring device 9 using the alternating current measuring signal produced by oscillator 13. One of the directricies I or II in which time is a specific function of resistance is selected corresponding to this measurement. By a subsequent control command to control logic 15, the ohmic resistance of coil 1 is measured by device 10 using a direct current measuring signal produced by constant current source 14. Then, preset counter or register 16 is loaded with the welding time ($t_s$) corresponding to the ohmic resistance, in accordance with the selected directrix. Thereupon, electronic switch device 5 is connected by setting switch 4 on contact Sch and the welding process is commenced, the duration being determined by counting down the stored numbered steps down to 0. The rate of the counts, already described as being directly proportional to the primary deviations, is varied during the welding process by means of devices 17 and 18. After withdrawal of plug from coil 1 of the shaped element, all of the measuring and display devices are reset to 0.

If needed, the welding process can be terminated without resetting by means of stop circuit 22. Switch 5 guarantees a connection current limit and provides so called "soft start" for the protection of the series connected devices.

While certain advantageous embodiments have been chosen the invention, it will be understood by those skilled in the art that various changes and modifications can be made therein without departing from the scope of the invention as defined in the appended claims.

What is claimed is:

1. A method of welding together plastic conduit elements using shaped elements containing windings of electrically conductive heating wire and supplying electrical energy to the wire by a control apparatus connected to a source of electrical energy such that an appropriate heating current is passed through the wire to heat and weld the components including the steps of
    manually producing a start signal,
    passing a direct current through the windings, of heating wire and measuring the ohmic resistance of the windings,
    allotting a time interval for the welding process by automatically selecting a number of counts as a function of the measured ohmic resistance corresponding to a selected one of stored a plurality of predetermined relationships based on conduit element type and shaped element type,
    storing the number of counts in a counting device,
    initiating the flow of heating current,
    supplying impulses to the counting device to reduce the count to zero, and
    terminating the flow of heating current when the count reaches zero.

2. A method according to claim 1 and further including the step of
    passing an alternating current through the windings and measuring the impedance of the windings to determine the type of shaped element to be used, and
    selecting one of the predetermined relationships on the basis of the impedance measurement of subsequent allotment of the heating time.

3. A method according to claim 2 and including modifying the frequency of the impulses to compensate for fluctuations in the source of electrical energy.

4. A method according to claim 3 wherein the welding is performed using any one of a plurality of possible shaped elements, and said plurality of predetermined relationships includes a programmed directrix for each shaped element from which the appropriate directrix can be chosen.

5. A method according to claim 2 wherein the welding is performed using any one of a plurality of possible shaped elements, and said plurality of predetermined relationships includes a programmed directrix for each shaped element from which the appropriate directrix can be chosen.

6. A method according to claim 5 and including selecting the electrically conductive material for the winding such that the ohmic resistance measurement is altered by ambient temperature and the heating time is thereby compensated for the influence of this temperature.

7. A method according to claim 2 and including selecting the electrically conductive material for the winding such that the ohmic resistance measurement is altered by ambient temperature and the heating time is thereby compensated for the influence of this temperature.

8. A method according to claim 1 and including modifying the frequency of the impulses to the compensate for fluctuations in the source of electrical energy.

9. A method according to claim 8 wherein the welding is performed using any one of a plurality of possible shaped elements, and said plurality of stored predetermined relationships includes a programmed directrix for each shaped element from which the appropriate directrix can be chosen.

10. An apparatus for the control and apportionment of electrical energy to a heating winding for welding tubular elements together wherein the winding is housed in a shaped element which can be placed around the adjacent ends of the tubular elements so that electrical energy can be supplied to the winding to heat and weld the elements together, and wherein the shaped element and winding is one of a plurality of different types thereof having differing characteristics, comprising the combination of:
    a source of electrical energy;
    means for measuring the ohmic resistance of the winding;
    counter means for storing a selected welding time as a preset count;
    means for automatically selecting a welding time as a function of the measured resistance in accordance with a predetermined relationship based on conduit element type and shaped element type and for storing the time in said counter;
    means for initiating flow of welding current from said source to said winding;
    pulse generator means for delivering pulses to said counter means while said welding current is flowing to cause the count in said counter means to count down to zero; and
    means for terminating the flow of current when said counter means reaches zero.

11. An apparatus according to claim 10 and including means for measuring the complex impedance of said winding to determine the type of shaped element to be used and for selecting one of plurality of predetermined relationships for subsequent determination of welding time.

12. An apparatus according to claim 11 and further comprising
    second pulse generator means coupled to said source of energy for adjusting the rate at which said counter means counts down as a function of source magnitude fluctuations.

13. An apparatus according to claim 12 and further comprising control logic means for controlling said measurements.

14. An apparatus according to claim 11 and further comprising control logic means for controlling said measurements.

15. An apparatus according to claim 10 and further comprising
    second pulse generator means coupled to said source of energy for adjusting the rate at which said counter means counts down as a function of source magnitude fluctuations.

16. An apparatus according to claim 10 wherein said source of electrical energy comprises an electronic switching means, having a connection current limit, for preventing faulty release of series connected safety devices.

17. An apparatus according to claim 10 wherein said source of electrical energy supplies alternating current.

18. A method according to claim 1 wherein the heating current is alternating current.

* * * * *